United States Patent [19]

Von Kohorn

[11] 4,279,868

[45] Jul. 21, 1981

[54] METHOD FOR LEACHING METAL BEARING ORES

[76] Inventor: Henry Von Kohorn, 22 Perkins Rd., Greenwich, Conn. 06830

[21] Appl. No.: 133,516

[22] Filed: Mar. 24, 1980

[51] Int. Cl.³ .......................... G22B 3/00; C01G 5/00; C01G 7/00
[52] U.S. Cl. .......................................... 423/29; 423/1; 423/27; 423/658.5; 299/5; 299/11; 75/101 R
[58] Field of Search .................... 423/1, 27, 29, 658.5; 299/5, 11; 75/101 R

[56] References Cited

U.S. PATENT DOCUMENTS

| | | | |
|---|---|---|---|
| 3,639,003 | 2/1972 | Spedden | 299/5 |
| 3,809,430 | 5/1974 | Michaelson | 423/27 |
| 3,834,760 | 9/1974 | Spedden | 299/5 |
| 4,017,309 | 4/1977 | Johnson | 75/101 R |

*Primary Examiner*—Brian E. Hearn
*Attorney, Agent, or Firm*—Ralabate, Perman & Green

[57] ABSTRACT

An improved leaching method for metal bearing ores, wherein removable, void-forming members are placed near the bottom of the ore body and removed during the leaching process, causing partial internal collapse and shifting of the ore, thus exposing additional ore surfaces to the effect of the leaching solution.

12 Claims, No Drawings

METHOD FOR LEACHING METAL BEARING ORES

BACKGROUND OF INVENTION

Among hydrometallugical work done during the last two decades have been efforts to separate metals, such as gold and silver from gangue material or host rock by leaching with a solvent, and specifically with cyanide solutions. Much of the early work was done by the Reno Metallurgy Research Center of the US Bureau of Mines, Reno, Nev.[1]. The present invention relates to an improved method of extracting metals from ores by the chemical leaching principle and specifically to non-agitation leaching methods, such as heap leaching by percolation.

[1] Inter alia see H. J. Heinen, D. G. Peterson & R. E. Lindstrom "Silver Extraction from Marginal Resources", paper delivered at the annual meeting of the American Institute of Mining, Metallurgical & Petroleum Engineers, New York, N.Y., Feb. 16, 1975.

In the extraction of metals, such as silver and gold from metal-bearing ore by the leaching process, the recovery of metals usually is far inferior to the recovery rates achieved by other known methods, as for instance those including roasting and flotation. The reason for this inferior recovery is the inability efficiently to heap leach rock which has been finely ground, because the leaching solution cannot satisfactorily filter through the densely packed ore particles. On the other hand, leaching ore crushed to a size common in heap leaching, for instance two to five centimeters, results in poor, and particularly uneven penetration of the leaching solution into the crushed ore. This inferior penetration is partly the result of the larger size of the crushed ore pieces, but is also due to the stationary position of the crushed ore.

Normally, in heap leaching, the leaching solution will pursue that downward path through the rock pile or heap, which is the path of least resistance, a phenomenon called channeling, resulting in uneven leaching action. It is possible, for the purpose of improving recovery through the rearranging of ores and diverting channeling, to set off small explosive charges within the leach pile. This approach, however, has the drawback of producing fines, i.e. small rock particles which are densely packed and impair the filtering down of the leaching solution.

It therefore is an object of this invention to increase the overall rate of extraction of the desired metals from crushed ore-bearing rock by the non-agitation leaching method.

It is a further object to increase the effectiveness with which the leaching solution acts upon all of the surfaces of the crushed ore on which metals are exposed, resulting in a more effective utilization of and/or reduction in the amount of leaching solution used and in the total time required to achieve optimum extraction.

It also is an object of the invention to increase the recovery of metals from ores by the heap leaching process by assisting and increasing the penetration of the leaching solution into the interior of the crushed rock by capillary action and dissolving the metals contained therein.

It is a further object of this invention to minimize the adverse effects of channeling, thereby significantly improving the efficacy of the leaching process.

Although the particulars of the method described herein relate, as an illustration, primarily to the extraction of precious metals, it should be understood that the principle of the invention may be applied to the leaching of other metal bearing ores.

In low grade gold and silver bearing ores, the ratio of these metals may vary greatly. Silver may occur at very low levels which sometimes are measured in parts per million, or it may occur at a level a thousand times that of the gold present. Despite a great deal of scientific testing of various ores, leaching generally requires an empirical determination of optimum process conditions, not only for precious but other metals, such as copper and zinc. The operating data enumerated herein therefore are intended to be only illustrative approximations having strict applicability to some, but not necessarily to all metal bearing ores.

In crushing ores for percolation leaching, the empirically determined optimum size of the crushed ore normally represents a comprise between small particle size, which would result in greater extraction as a result of the larger surface area, and the need to minimize fines which would inhibit percolation. Because leach liquor penetrates into ore by capillary action along induced or natural planes, it is important to maximize the surface area of crushed rock exposed to the leach liquor without crushing the rock to a very fine size, an object aided by the present invention.

Heap leaching of low grade silver and gold ores with dilute alkaline cyanide solution is a relatively low capital, low operating cost method. In commercial applications, this kind of heap leaching often is conducted on ore which has been stacked into heaps or piles on watertight drainage pads which permit recirculation and prevent loss of leach liquor. The sides of the ore piles or heaps are sloped and the leach liquor containing the dissolved gold and silver values flows into channels at or below ground level for recirculation. The impervious pads may consist of asphalt, reinforced conrete or other suitable material.

Heap leaching as practiced with respect to the present invention, is percolation leaching in which the cyanide leach liquor is introduced by spraying from perforated plastic pipes or by sprinkling from plastic sprinklers. The volume of leach liquor filtering down through the pile containing from 1,000 tons to upward of 10,000 tons may be between 500 and 2,500 liters per square meter of pile surface area, depending upon the height of the pile. The piles or heaps often are shaped to resemble truncated pyramids ranging in height from two to five meters or more. The height is determined by the size and nature of the crushed ore, the permeability of the pile, the composition, concentration and rate of required replenishment of the leach liquor. The leach liquor is kept alkaline to prevent the loss of cyanide by hydrolysis and the contamination of local water resources. The leaching solution, the optimum concentration of which also must be empirically determined, may contain from two to five grams of sodium cyanide per 1,000 kilograms of solution and the pH is maintained at 10 to 11 with the addition of lime or caustic soda. The leaching time for low grade silver and gold ores crushed to 1 to 5 centimeters may vary from 5 to 45 days. Dissolved silver and gold values can be recovered from pregnant leach liquor by absorption on activated carbon or on zinc, which can then be stripped with alkaline cyanide solution at approximately 100° to 110° centigrade under slight pressure. Other forms of desorption or precipitation may be used and the stripped metal values can be recovered by any methods practiced by those skilled in the art, such as electrowinning.

DESCRIPTION OF THE INVENTION

The extraction and recovery of metals susceptible to leaching by chemical hydrometallurgical methods can be significantly improved by causing the metal bearing ore slightly to shift position during the leaching process. I have discovered that such improvement can be obtained by a relatively minor movement of the ore or rock forming the pile, heap ore body to be leached above ground, and does not require mixing, agitation or a violent disturbing of the ore. It is sufficient to bring about a movement or shifting of ore by causing a very slight collapsing of the lower portions of the ore body. The term "ore body" as used herein is intended to pertain to heaps and piles above ground and not to underground mine ore bodies; the terms "ore body", "heap", and "pile" are used interchangeably.

The objects mentioned may be achieved by placing a number of void-creating members or objects in the pile, these members having such shape that, when removed or otherwise eliminated they will leave behind voids in it. As used in this specification, the term "void-creating member" is intended to refer to any rigid structure which, when present in an ore body, such as an above-ground heap or pile, incorporates or creates beneath it an empty space and which, when removed, leaves behind a void. When these voids develop through the pulling out or destruction of said members, and assuming that these members have such configuration as to leave behind voids of sufficient size, those portions of the ore in the pile which are situated above said members will collapse into and fill the voids created. The ore affected by these events will, to a greater or lesser extent, shift its position. It is this shifting of position, dislocation, rotation or other movement of the crushed ore which is an essential feature of the present invention because it results in exposing additional ore surfaces to the downward trickling leaching solution and also because it separates crushed rock pieces, the surfaces of which are pressed against each other, thus opening up sealed-off surfaces. By changing the angle of the crushed rock pieces, such shifting of the ore also intensifies the action of the leach liquor on many of those ore surfaces previously underexposed to the leach liquor. Leaching solution penetrates into the material to be leached by capillary action along fracture planes, often requiring only a sustained wetting of the ore surfaces to ensure such capillary action. This type of contact is increased by even a slight shifting of the material. For instance, as a result of removing the void-creating members and the dropping of the ore above the voids, some of the ore pieces will rotate so that previously downward-facing surfaces inaccessible to the leach liquor will now face upward or sideways and come in sufficient contact with it to allow penetration.

The movement of the crushed rock also will force much of the leaching solution to shift away from its former paths of least resistance. While the present invention will not entirely prevent channeling, it will, as a minimum, cause the leaching solution to find new paths of least resistance, and this result alone will improve the metal extraction and recovery rate. If, for instance, the members leaving voids behind are removed after half the leaching process has been carried out, the channeling of the leaching solution which has resulted in ununiform treatment and therefore in the underexposure of some, and the overexposure of other, ore, will now shift, thus tending to equalize the uneven leaching effect and to improve metal recovery.

The void-creating members through which the objects of this invention are achieved, may be formed of metal, plastic, concrete, or other suitable materials. When the void-creating members are to be removed by pulling out, the material selected for these members will resist the corrosive effect of the leach liquor, and when the void-creating members are to be removed by destruction or dissolving, the material selected will be corroded by the leach liquor. The choice of these materials therefore depends on the nature, and in particular on the acid or alkaline nature of the leaching solution. The void-creating members may be elongated, have the form of cylinders or tubes, or they may be profiles having a U-shape or V-shape. They also may have the form of segments of spheres or other shapes. In the case of U-shapes or V-shapes, the profiles are placed in the pile in inverted position, and rounded or spherical segments are placed in the pile with the extremity of the curvature at the uppermost point.

The said void-creating members are placed in the pile, heap or ore body before it is started or in the initial stages of building it, the purpose being to form the voids referred to at or near the bottom of the ore body to be leached.

In those instances, where the void-creating members are to be removed by destruction, the said members in their entirety, or parts or components of said members, may consist of the same material, i.e. the metal, to be extracted from the ore body. For instance, in the case of acid copper leaching, the void-creating members to be removed by corrosion or dissolving, may have structural or reinforming components containing copper. Their integrity is destroyed or they are dissolved in whole or in part so as to cease forming voids. Copper-containing alloys, such as brass, may be employed. In such instances, the metal to be extracted from the ore body and that contained in the void-creating members which are dissolved, can subsequently jointly be recovered by the same process.

The shifting, moving, rotating, dislocating, or other disturbing effect on the rock pieces caused by the collapse of the ore into the voids created, dissipates progressively in the direction of the upper layers of the ore pile. Although diminishing in an upward direction, there is, nevertheless, a slight movement of the ore. Even a slight shifting of as little as one to two milimeters of a piece of crushed ore, will expose significant additional ore surfaces to the effects of the leach liquor, whether by direct flow or capillary action. Separating the surfaces of two pieces of crushed ore which are pressed against each other by one or two millimeters, will permit the leach liquor to penetrate between these two surfaces and will permit capillary action which must be sustained by additional leach liquor finding its way to these surfaces. It thus is clear that the disturbing effect of the collapse of the lower layers of the ore pile will travel upward in decreasing intensity, but will still have a beneficial effect on the action of the leach liquor on the ore as a whole.

Another and preferred method of removing said void-creating members is the pulling out of said members which can be done by conventional earth-moving equipment. Members which are removed by pulling out rather than by destruction or dissolving, are made of a material which is resistant to the cyanide solution employed. Removing such re-usable members leaves behind the desired voids and causes a partial collapsing of the leach heap, bringing about downward as well as lateral shifting of nearby crushed ore, thus exposing additional surfaces to the leaching solution or causing the solution to contact some of the ore surfaces more intimately, thus penetrating into interior areas through fissures and fractures.

For the same reasons the optimum operating conditions for the dissolving and recovery of metal values are normally established empirically, the optimum size and shape of the void-creating members is best determined empirically. The embodiments of the said members, as well as their spacing and positioning described herein are therefore only intended to be illustrative. Without limiting the scope of this invention, the additional illustrations that follow pertain specifically to the extraction and recovery of silver and gold from ores by the alkaline cyanide leaching method commonly practiced, but the invention may be applied to other types of above-ground heap leaching as well. In the case of heap leaching copper ores, for instance, acid solutions may be employed and the materials from which the void-creating members are made will be selected so as to resist the acid solution if they are to be removed by pulling out or so as to be corroded if they are to be removed by destruction. The void-creating members may be round and/or they may be hollow, having the cross section of any void-creating profile. They normally have an essentially smooth outside surface to facilitate their removal by pulling out.

According to the present invention, the heap leaching method is practiced as follows: The void-creating members are laid down prior to or in the early stages of building the pile formed of metal bearing ore, such as silver and gold bearing ore. Then the building of the pile is completed and the leaching process is commenced. After a pre-determined period of time, the void-creating members are removed either by pulling out or by destruction. The voids left behind are filled as a result of the partial collapse of the pile, with resulting shifting, rotation or other movement of the ore filling the voids and that of the ore above it. The leaching process is then carried to conclusion.

In commercial practice, where piles with a width of 30 meters or more are not uncommon, iron and steel cylinders, inverted V-profiles or U-profiles having a length of say 15 meters, i.e. equal to half the width of the pile or slightly greater, can easily be pulled out from one of the sides of the pile by known earth-moving machines.

Concrete hollow pipe lengths and other void forming members may be placed close together in the pile and removed successively, so as to cause a series of successive collapses in the ore body. According to a preferred embodiment of the invention, thick-walled concrete or other suitable pipe, cut to appropriate lengths, with a diameter of approximately one to two meters or more, is used to provide the void-forming members. The length of the cut pipe pieces may slightly exceed half the width of the pile in which it is used, so that, when two such discrete pieces forming a pair, are laid down end to end near the bottom of the pile, one end of each piece will slightly protrude from opposite sides of the pile. Each such voidforming piece is provided with suitable means to permit attaching it to earth-moving machines for removing by pulling out. These means may be attachments or holes in the wall of the pipe. The said lengths of pipe may be laid down in parallel or other relationship to each other.

When the leaching has been partially performed, one third of the void-creating members are removed. Normally, those members to be removed at one time or as a set are evenly distributed over the ground area of the pile. Every third pair of pipe lengths is pulled out by front-end loaders or other machines working along the two opposite sides of the pile from which the pipe lengths protrude.

The diameter of the pipe and the spacing between parallel pairs of pipe are empirically determined because, given the crushed ore characteristics, these factors represent the best compromise between increased costs and increased extraction and recovery.

The leaching is continued for some additional time at which point another third, or half of the remaining members, are pulled out. After some additional leaching, all remaining members are pulled out and the leaching is completed. This method will cause three successive partial collapses accompanied by a slight dislocation of ore surfaces each time the leach pile is disturbed in this manner. The nature and composition of the leach liquor, the volume in circulation, the leaching times and other process conditions are similar to those normally practiced by persons skilled in the art of heap leaching and are normally determined empirically.

Thick-walled concrete pipes with a diameter of one to two meters are relatively inexpensive and are reusuable. If the width of the pile near the bottom is 20 meters, such pipe is cut into lengths of approximately 11 to 12 meters. To facilitate pulling out, these elongated void-creating members may be placed on or close to the impervious pad on a previously laid down sloping layer of crushed rock at an angle of up to approximately 40 degrees from the horizontal plane, say 20 degrees, the lower end being one meter above the ground and protruding slightly from the pile. By attaching the lower end to a pulling device, the member may be pulled out more easily due to its inclined axis. The directions of the incline of the axes of the elongated members may vary or alternate.

Members that are segments of spheres and similar non-elongated members may be used, provided they will be corroded by the leaching solution. They may, but need not, touch each other. They are removed only by the disintergration of their material by the leaching solution.

Assuming a total height of the ore pile of five meters, the total weight of the ore resting on the void-creating members will require the ability of these members to support the weight of approximately one to three kilograms per square centimeter.

The method herein described may be applied to the acid leaching of copper, zinc and other ores, whether in the shape of heaps or contained in vats or other structures, but in the case of leaching silver and gold bearing ores, the cyanide solution usually is kept alkaline because cyanide acids tend to contaminate the ground water. The process conditions described may be varied by persons skilled in the art so as to obtain optimum results with respect to the ores to be treated, provided the principle of placing void-creating members in and removing them from the ore body is practiced.

What is claimed is:

1. A method for the extraction and recovery of metals from ores by leaching crushed ore comprising:

(a) providing a plurality of removable, void-creating members inside the ore body to be leached,
(b) partially performing the leaching,
(c) removing said members by pulling out so as to create internal voids in said ore body, causing partial internal collapse and shifting of ore in said ore body, and
(d) completing the leaching.

2. The method of claim 1 wherein said void-creating members comprise pairs of discrete concrete pipes, laid end to end, each such pipe having a length slightly in excess of half the width of the ore body.

3. The method of claim 1 wherein the void-creating members having upon placement in said ore body essentially an invertied U-shape or V-shape.

4. The method of claim 1 wherein said void-creating members are provided with means for attaching machines capable of pulling out said members.

5. The method of claim 1 wherein said void-creating members are removed successively in sets, each set being distributed essentially uniformly over the ground area of the pile.

6. The method of claim 1 applied to the alkaline cyanide heap leaching of gold and silver bearing ores.

7. A method for the extraction and recovery of metals from ores by above-ground leaching comprising:
(a) providing a plurality of void-creating members inside the ore body to be leached, prior to or during the initial stage of construction of said ore body, said void-creating members being externally derived structures comprising material whose integrity and structure are capable of being destroyed in place by the corrosive leaching solution employed, but not comprising particles of the ore to be leached, and
(b) leaching the ore with said leaching solution, thereby corroding said void-creating members and causing partial internal collapse and shifting of ore in said ore body.

8. The method of claim 7 wherein said void-creating members have cavities therein, said cavities disappearing when said structure is corroded by said leaching solution.

9. The method of claim 7 wherein said void-creating members have the structure of elongated cylinders, inverted U-shape profiles, inverted V-shape profiles, spheres, segments of spheres, hollowed-out shapes or segments of hollowed-out shapes.

10. The method of claim 7 wherein said void-creating members comprise the same material as the material to be extracted from the ore body.

11. The method of claim 7 wherein said void-creating members comprise copper.

12. The method of claim 7 wherein said void-creating members are placed in the ore body in a definite spaced relationship to each other.

* * * * *